United States Patent [19]

Popovic

[11] Patent Number: 4,844,572
[45] Date of Patent: Jul. 4, 1989

[54] LIGHT MODULATOR INCLUDING WAVEGUIDE WITH ALTERNATING SEMICONDUCTOR SECTIONS

[75] Inventor: Radivoje Popovic, Zug, Switzerland

[73] Assignee: LGZ Landis & Gyr Zug AG, Zug, Switzerland

[21] Appl. No.: 224,874

[22] Filed: Jul. 26, 1988

[30] Foreign Application Priority Data

Aug. 13, 1987 [CH] Switzerland .................. 3120/87

[51] Int. Cl.⁴ .................. G02B 6/10; H01L 31/12
[52] U.S. Cl. .................. 350/96.14; 350/96.12; 350/96.13; 357/19; 357/30
[58] Field of Search .............. 350/96.10, 96.11, 96.12, 350/96.13, 96.14; 357/17, 19, 20, 23.1, 25, 30

[56] References Cited

U.S. PATENT DOCUMENTS

| | | | |
|---|---|---|---|
| 3,724,926 | 4/1973 | Lee | 357/19 X |
| 3,795,433 | 3/1974 | Channin | 350/96.14 X |
| 3,827,000 | 7/1974 | Matsushita et al. | 350/96.14 X |
| 3,976,358 | 8/1976 | Thompson | 350/96.13 X |
| 4,003,632 | 1/1977 | Komiya et al. | 350/96.14 X |
| 4,166,669 | 9/1979 | Leonberger et al. | 350/96.14 |
| 4,211,467 | 7/1980 | Cross et al. | 350/96.14 |
| 4,359,260 | 11/1982 | Reinhart et al. | 350/96.12 |
| 4,518,219 | 5/1985 | Leonberger et al. | 350/96.14 |
| 4,521,069 | 6/1985 | Ikeda | 350/96.13 |
| 4,675,518 | 6/1987 | Oimura et al. | 350/96.14 X |
| 4,685,763 | 8/1987 | Tada et al. | 350/96.14 |
| 4,691,983 | 9/1987 | Kobayashi et al. | 350/96.12 |
| 4,706,103 | 11/1987 | Ranganath | 357/30 |
| 4,714,312 | 12/1987 | Thaniyavarn | 350/96.14 |
| 4,737,003 | 4/1988 | Matsumura et al. | 350/96.14 |
| 4,746,183 | 5/1988 | Soref et al. | 350/96.14 |
| 4,778,234 | 10/1988 | Papuchon et al. | 350/96.12 |
| 4,787,691 | 11/1988 | Lorenzo et al. | 350/96.14 |

FOREIGN PATENT DOCUMENTS

| | | | |
|---|---|---|---|
| 55-73019 | 6/1980 | Japan | 350/96.14 X |
| 2142155 | 1/1985 | United Kingdom | 350/96.14 X |

OTHER PUBLICATIONS

Tien et al., "Building the Integrated Optical Circuit" Optical Spectra 6/81 vol. 15, No. 6, pp. 50-58.
Carenco et al., "GaAs homojunction rib wavegude ... " J. Appl Phys vol. 51, No. 3, 3/80, pp. 1325-1327.

*Primary Examiner*—William L. Sikes
*Assistant Examiner*—Brian M. Healy
*Attorney, Agent, or Firm*—Marmorek, Guttman & Rubenstein

[57] ABSTRACT

A semiconductor light modulator is disclosed. The light modulator comprises a semiconductor body and a waveguide for guiding light rays formed in the body. The waveguide comprises waveguide sections of first and second types formed alternately in a series. Each waveguide section of the first type is delimited at least in part by a depletion zone. A voltage U may be applied for controlling the size of the depletion zone delimiting the sections of the first type to vary the ability of the sections of the first type to guide light. Illustratively, when the voltage U is near zero, the light confining characteristics of the sections of the first and second type are substantially identical, so that light rays are guided along the waveguide from one section to another. When the voltage U is increased so as to increase the size of the depletion zones delimiting the waveguide sections of the first type, then there are losses within the waveguide sections of the first type and at the interfaces between the waveguide sections of the first and second type. Thus, the voltage U may be applied to selectively modulate the intensity of light propagating in the waveguide.

11 Claims, 2 Drawing Sheets

LIGHT MODULATOR INCLUDING WAVEGUIDE WITH ALTERNATING SEMICONDUCTOR SECTIONS

BACKGROUND OF THE INVENTION

The instant invention relates to a light modulator and, more particularly, to a light modulator formed from a semiconductor material and suitable for integration with other electronic components.

BACKGROUND OF THE INVENTION

In modern telecommunications, information is transmitted from a transmitter to a receiver by means of glass fibers, free from external interference. Electronic signals are converted for this purpose into light signals in the transmitter, and are converted into electronic signals at the destination, for instance by means of a photodiode, for further processing. The production of the light signals to be transmitted is accomplished by means of an intensity-controlled light source or by means of a light modulator which changes the intensity of a light source which transmits with a constant output.

Applications are known in the art, in which a sensor and auxiliary electronics are connected by means of a fiber optical light guide to a central exchange. Illustratively, the sensor and auxiliary electronics receive their operating energy through light received from the central exchange. The measured values of the sensor are transmitted back to the central exchange by means of intensity modulated light. Optical elements capable of being fully integrated with the rest of the circuit are desirable for such applications.

Light modulators operate according to different physical principles (Handbuch für Hochfrequenz- und Elektro-Techniker, published by C. Rint, Dr. A. Hüthig Verlag, Heidelberg, Volume 5, p. 675ff).

In "Integrated Optics", Springer-Verlag 1975, ISBN 3-540-07297-7, published by E. Tamir, a number of light modulators which can be made of the relatively expensive material, GaAs, are described. Such modulators utilize the large electro-optical effect of GaAs and are suitable for integration with control circuits.

The width of the forbidden zone in the band model of a semiconductor determines an upper frequency limit of electromagnetic radiation; above this frequency, strong absorption in the semi-conductor begins. By means of an electric field in the semiconductor it is possible to alter the width of the forbidden zone and to control the intensity of radiation from a narrow frequency band, near the upper limit frequency.

A method is further known in which free charged particles in the semiconductor change its indices of refraction. The concentration of free charged particles is predetermined by doping and can be controlled by electric potentials, e.g. in p-n junctions.

C. M. Horwitz et al. describe in Solid-State Electronics, Vol. 23, 1980, pages 1191ff, how the absorption of light in a p-i-n diode made of silicon can be altered in the area of the intrinsic semiconductor material by changing the density of the hole-electron plasma which is produced by the forward flow of current in the diode. Currents of several tens of amperes are however required to obtain a significant change in absorption.

On page 283 Tamir describes an asymmetric one-dimensional waveguide made of GaAs, the lower cut-off frequency of which can be changed by an applied potential. This cut-off modulation is limited to the monomode of the waveguide and requires very close tolerances in the dimensions of the waveguide.

In "Optical Waveguides in Silicon IC-Technology" (Proceedings of the 14th Yugoslav Conference on Microelectronics, Beograd, May 14–16, 1986, pp. 183–189) popovic describes a vertically and horizontally laid-out symmetrical waveguide for light which can be produced using the known processes of bipolar and CMOS technology on a substrate of silicon.

It is an object of the present invention to provide an efficient semiconductor light modulator. More particularly, it is an object of the invention to provide a light modulator that is independent of the electro-optical effect of the material from which it is formed, functions with little energy, is suitable for integration with other electronic components on a substrate and can be used for a wide spectrum of the electromagnetic radiation below the upper limit frequency of the semiconductor.

SUMMARY OF THE INVENTION

The present invention is a semiconductor light wave modulator. The modulator comprises a waveguide for guiding light formed in a semiconductor body. The waveguide comprises waveguide sections of first and second types formed alternately in a series. Each waveguide section of the first type is delimited at least in part by a depletion zone. A voltage U may be applied for controlling the size of the depletion zone delimiting the waveguide sections of the first type.

Illustratively, when the voltage U is near zero, the light guiding characteristics of the waveguide sections of the first and second types are nearly identical, so that light rays are guided along the waveguide from one section to another. When the voltage U is increased so as to increase the size of the depletion zones delimiting the waveguide sections of the first type, the light guiding characteristics of the two types of waveguide sections become different. Thus, there are losses within the waveguide sections of the first type and losses at the interfaces between the two types of sections. Thus, the voltage U can be selectively applied to modulate the intensity of light propagating in the waveguide.

The modulator of the present invention provides a number of significant advantages. First, the inventive modulator is independent of the electro-optical effect of the material from which it is formed and thus can be formed from relatively inexpensive silicon. Second, the modulator functions with little energy and finally, the modulator is suitable for integration with electronic components on a substrate.

BRIEF DESCRIPTIONS OF THE FIGURES

DETAILED DESCRIPTION OF THE INVENTION

Figure 1:
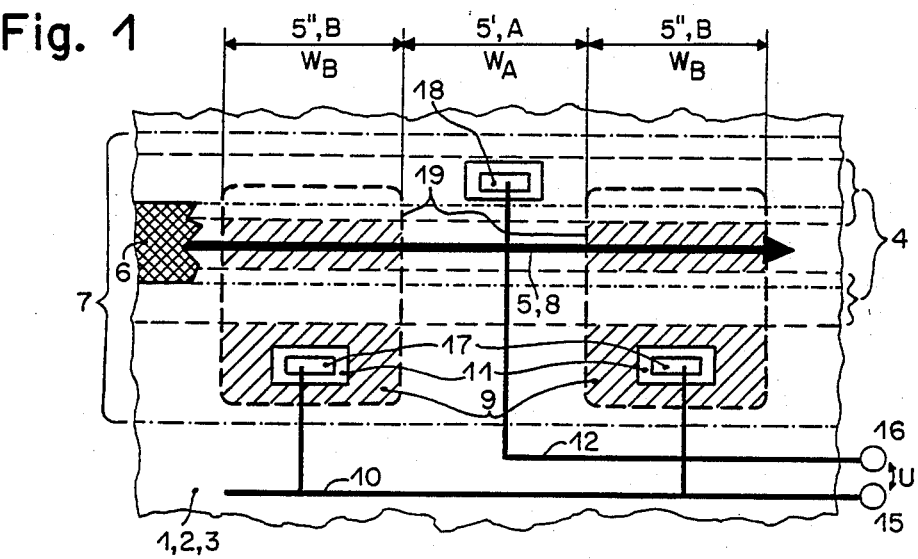
FIG. 1 shows a schematic top view of a light modulator in a semiconductor structure in accordance with an illustrative embodiment of the present invention.

FIG. 1 schematically shows the arrangement of a light modulator formed from semiconductor material including a p-type substrate 1. It comprises a number of alternate sections A and B following each other. The sections B have a length $w_B$, while a section A bordered by two sections B has a length $w_A$.

Figure 2:
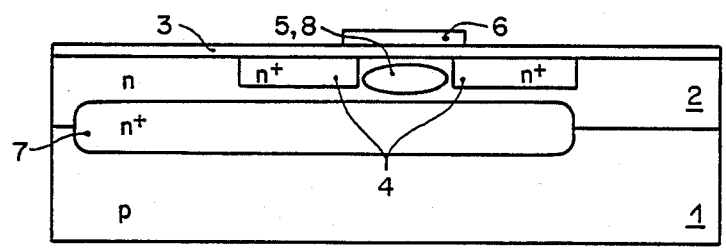
FIG. 2 shows a schematic cross-section through a section A of the light modulator of FIG. 1.

FIG. 2 shows the construction of a section A. An n-type layer 2 built up epitaxially on p-type substrate 1 is protected by an insulating cover layer 3. A pair of strips 4 made of an n+-type semiconductor material delimits an area for the waveguide 5 in the plane of the epitaxial layer 2, since the index of refraction in the strips 4 is smaller than in the waveguide 5. A gate electrode 6 formed on the cover layer 3 covers the waveguide over its entire length. The gate electrode 6 is made of an electrically conductive layer and can for example have the electric potential of the strips 4. Waveguide 5 is delimited from below by means of an n+-type layer 7 sunk in between substrate 1 and epitaxial layer 2. Negative charged particles accumulate in the area of the gate electrode 6 as in a MOSFET in a thin layer of the semiconductor directly below the cover layer 3 and lower the refractive index. The waveguide 5 is thereby delimited in all directions in the plane of FIG. 2 by zones having a lower refractive index than the waveguide 5, i.e. light rays 8 are guided by total reflection through the waveguide 5 in a direction perpendicular to the plane of the drawing in FIG. 2.

The two n+-type strips 4 and the n+-type layer 7 are resistively connected to each other by the n-type layer 2.

In section B (FIG. 3) the material of the n-type layer 2 is changed above the sunken layer 7 by means of doping into a p-type material of equal conductivity. A p-type zone 9 occupies the space between the cover layer 3 or the strips 4 and the sunken layer 7. The boundary of zone 9 is determined by the width of the sunken layer 7 which prevents direct abutment and resistive electrical contact between the p-type substrate 1 and the p-type zone 9.

A supply circuit 10 contacts the zone 9 resistively through a window in the cover layer 3 by means of a p+-type island 11, while a connection 12 establishes a resistive contact to the strips 4 and to layer 7 through another window in the cover layer 3. The gate electrode 6 is preferably connected to connection 12.

The p-type zone 9, together with the n-type zones surrounding p-type zone 9, constitute parallelly connected p-n junctions distributed in space with depletion zones 13. The depletion zones 13 are located alongside the waveguide 5. A negative off-state voltage U can be maintained across the p-n junctions by means of supply circuit 10 and connection 12. The expansion of the depletion zones surrounding the junctions can be controlled by means of the off-state voltage U.

Figure 3:
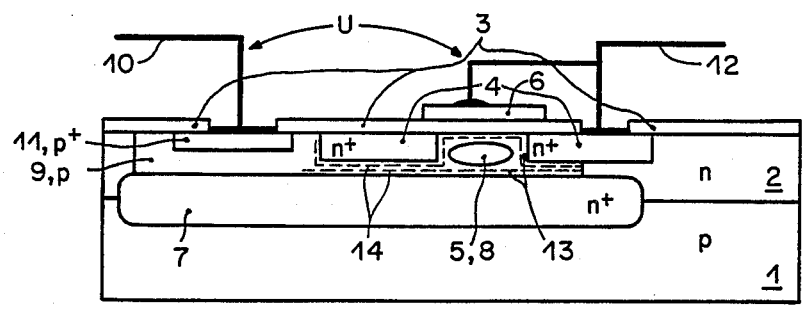
FIG. 3 shows a schematic cross-section through an active section B of the light modulator of FIG. 1.

As long as the off-state voltage U is practically zero, the depletion zones 13 are thin and limited practically to the interface 14 between the p-type zone 9 and the n-type zones. When the p-type zone has identical geometrical dimensions and an identical concentration of the charged particles as the surrounding n-type zones, the conditions for the confinement (i.e. guiding) of light rays 8 are the same for a waveguide 5 with a structure as shown in FIG. 3 as for a waveguide 5 in a structure according to FIG. 2.

An increase of the off-state voltage U (FIG. 3) between connections 10, 12 increases the size of the depletion zones 13 from the interfaces 14 into the waveguide 5 due to different dopant concentrations. The refractive index is higher in the depletion zones 13 than in the remaining, purely p-type area 9 of the waveguide 5 and in the n-type zones. In the area of the waveguide 5, a median refractive index becomes higher as the off-state voltage U increases. Since the depletion zones 13, i.e. the zones with the highest refractive index, constitute the outer parts of the waveguide 5, the conditions for guiding (i.e. confining) of light rays 8 in the waveguide 5 can be effectively altered by the off-state voltage U. For example, depending on the voltage U the confinement of light may be significantly reduced.

Figure 4:
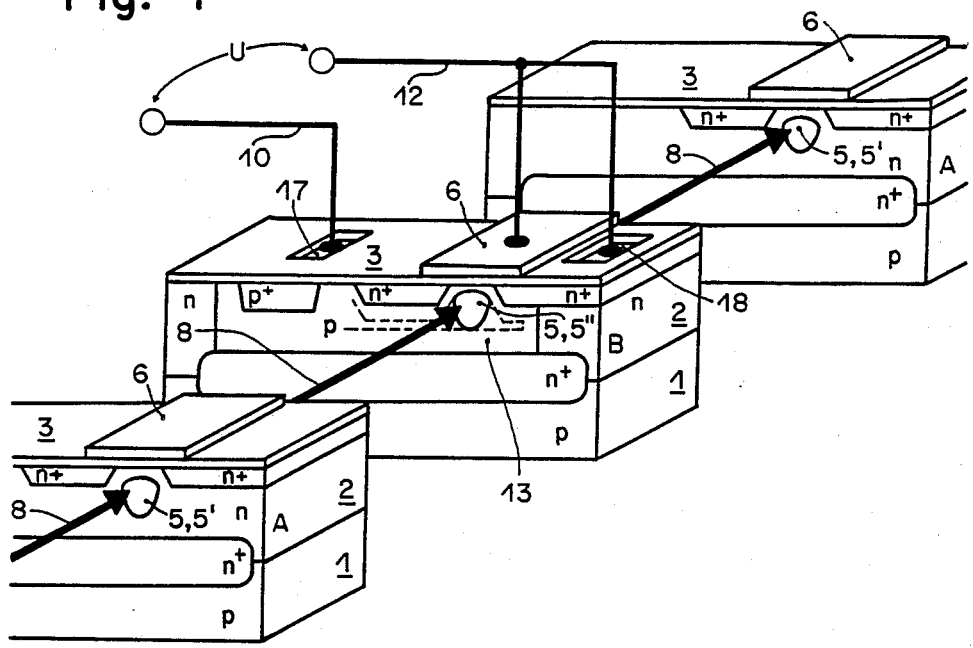
FIG. 4 shows a schematic cross-section through sections A and a section B of the light modulator of FIG. 1.

In an embodiment of the light modulator (FIG. 1 and FIG. 4) the waveguide 5 guides light through a row of sections A and B connected alternately one after the other. After a section A in which a waveguide section 5' is structured according to FIG. 2 follows a section B with a waveguide section 5'' structured according to FIG. 3. Then sections A and B follow again (FIG. 1 and FIG. 4). The waveguide sections 5' and 5'' have a common axis which is represented here by light rays 8, and constitute the waveguide 5 of the light modulator in the epitaxial layer 2. The waveguide 5 is delimited in all sections A, B jointly by the strips 4, by the sunken layer 7 and by the gate electrode 6. A directional arrow for the light rays 8 has only a symbolic character since the light rays 8 can propagate in both directions within the waveguide.

The rays 8 are preferably reflected at the end of waveguide 5 opposite to the input point of the light modulator, for example, by means of a reflecting end of a waveguide section 5' so as to traverse the waveguide 5 twice in the light modulator.

The light modulator 5 is drawn in a straight line for the sake of simplification. Any curve, determined by special conditions, e.g. the position of optical connections etc., of the waveguide 5 in the epitaxial layer 2 could apply since the light ray 8 is guided laterally by the strips 4.

In the top view (i.e. FIG. 1) the gate electrode 6 is shown only at the right edge of FIG. 1 and in its continuation is only indicated by dashes in lateral delimitation while cover layer 3 and the epitaxial layer 2 are not represented.

The p-type zones 9 are arranged in such manner above the sunken layer 7 so that they do not form an electric contact with substrate 1. As shown in FIG. 1, a negative pole 15 of a source (not shown) of the off-state voltage U is brought to the p+-type islands 11 and to the p-type areas 9 by means of a supply circuit 10 through contact window 17 in the cover layer 3. A positive pole 16 of the off-state voltage U is brought by means of connection 12 through a connection window 18 in cover layer 3 to the strips 4.

In general, an embodiment of the light modulator has n+1 sections A and n sections B, alternating in a row. The modulation capacity of the light modulator shows a linear increase as a function of the number n.

The lengths $W_A$, $W_B$ of the waveguide sections 5', 5'' in each section A or in each section B are preferably selected to be identical in length and within a range of 50 μm to 200 μm.

Minimally, a light modulator has a light path going through at least two sections A and one section B (FIG. 4).

As long as the off-state voltage U is practically zero, the median refractive indices of the waveguide sections 5′, 5″ are practically identical in the sections A, B. In a transition from a waveguide section 5′ into a waveguide section 5″ or vice versa, no change occurs in the guiding conditions of the light rays 8, i.e. a maximum permeability of the waveguide 5 to the light rays 8 can be attained.

An off-state voltage U markedly different from zero between the supply circuit 10 and the connection 12 increases the median refractive index in the waveguide sections 5″ by comparison to the median refractive index in the waveguide sections 5′. The conditions of guiding of the light rays 8 in the two types of waveguide sections 5′, 5″ become different with increasing off-state voltage U. Reflection losses in the waveguide sections 5″ and at the junction between the sections A, B weaken the intensity of the light rays 8. The permeability of the light modulator to light rays 8 therefore decreases with increasing off-state voltage U.

The manner of operation of the light modulator is now dependent only on the expansion of the depletion zone 13 at the p-n junctions which can be produced in any known semiconductor material and does not depend on an electro-optical double index effect, i.e. a light modulator according to claim 1 can be made of any known semiconductor material, e.g. of inexpensive silicon.

Depletion zones 13 are not only known with p-n junctions and with MOS structures, but also with Schottky contacts. An analogous application of these contacts for the production of other embodiments of waveguides 5 and of light modulators can also be imagined.

An embodiment of the light modulator which is advantageously built up on a polished wafer made of p-type silicon in the (100)orientation as substrate 1 (FIG. 1) as is customary for integrated circuits, has for example the number of steps equal to 10, i.e. it comprises 11 sections A and 10 sections B. The length $W_A$, $W_B$ of segments A, B, each amount to approximately 100 $\mu$m.

The light modulator functions advantageously with off-state voltages U between 0 V and approximately $-10$ V and with currents which are lower than 1 $\mu$A. The light rays 8 are preferably selected with a wave length in the range of 1.2 $\mu$m to 2.0 $\mu$m.

Such a substrate 1, doped with boron, has a specific resistivity of 50 Ohm-cm; this corresponds to a concentration of approximately $10^{15}$ cm$^{-3}$ of boron atoms.

The n$^+$-type sunken layer 7 is preferably produced through use of a mask on the top surface of substrate 1 by means of arsenic diffusion at the location preselected for the waveguide 5. The arsenic atoms penetrate to a depth of approximately 5 $\mu$m. The concentration of the arsenic at the surface comes to approximately $2 \times 10^{19}$ cm$^{-3}$.

The epitaxially grown n-type layer 2, doped with phosphorus, is approximately 0.01 mm thick and has a phosphorus concentration of approximately $10^{15}$ cm$^{-3}$.

The surface is then oxidized until the insulating cover layer 3 is approximately 7 $\mu$m thick.

Inlet windows 19 for the areas 9 are etched in at the locations preselected for the sections B. The bared portions of epitaxial layer 2 are doped with diffused boron down to the sunken layer 7. The concentration of the boron atoms is in the range of $10^{16}$ cm$^{-3}$ to reach a comparable concentration of charged particles as in the remainder of layer 2. The cover layer 3 which serves as a mask is then etched away over the entire surface of the substrate.

A second oxidation process produces a new cover layer 3 with a thickness of only 100 nm.

In the following step, a strip of polycrystalline silicon, for example 0.01 mm wide, is provided in the area of the waveguide 5 to become a gate electrode 6. The gate electrode 6 serves in this case, at the same time, as part of a mask during an etching process for baring surfaces for the doping of strips 4. A gate electrode 6 can also be made of a vapor deposited metal.

Photo-resist masks applied in a known manner on cover layer 3 and the gate electrode 6 delimit the areas 4; 6, 11 which are preselected for heavier doping during two ion implantation steps. The strips 4 and the gate electrode 6 are doped in a first implantation step with a dose of approximately $10^{16}$ cm$^{-2}$ of phosphorus atoms. After changing the photo-resist mask, boron atoms in a dose of approx. $10^{15}$ cm$^{-2}$ are implanted in the islands 11.

In a final annealing process the doped elements 4, 7 and 11 are brought into their final form. The strips 4, for example, spread out for approximately 2.5 $\mu$m within the limits of the gate electrode 6 and for approximately 3 $\mu$m into the depth of layer 2. The sunken layer 7 expands also into the n-type and p-type epitaxial layer 2. It reduces the epitaxial layer 2 to a thickness of approximately 5 $\mu$m. A cross-section usable for the waveguide has therefore the approximate dimensions 5 $\mu$m $\times$ 5 $\mu$m.

Contact windows 17, connection windows 18, the metallized circuit 10 and the connections 12 as well as a passivation layer (not shown) are applied in a known manner.

The p-type substrate 1 can also be replaced advantageously by a p-well which extends in the area of the light modulator on an n-type substrate.

The manufacturing process described above is based on the known process steps of the technology of integrated circuits using silicon, but can be carried out in form of corresponding variants by using all the other, technically usable semiconductor materials. The manufacture of a complementary light modulator is in particular possible by appropriately replacing the n-type and p-type parts by parts of the complementary conductivity type.

The doping indications can be changed within certain limits, and other doping elements in the groups III or V can be used.

Simultaneous manufacture of the light modulator, and of associated electronics, photo diodes and luminous diodes (laser) is especially advantageous in the silicon technology.

Figure 5:
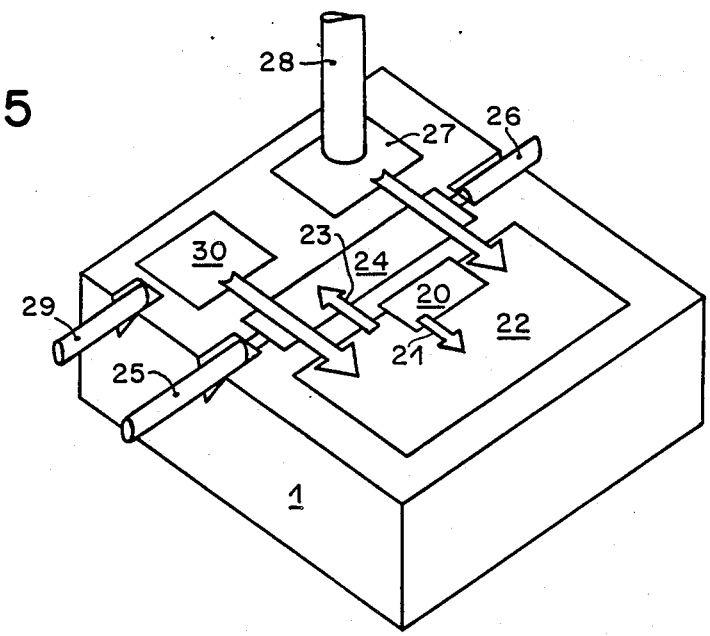
FIG. 5 is a sketch of a sensor module which utilizes the light modulator of FIGS. 1–4 in accordance with an illustrative embodiment of the present invention.

A possible embodiment of a sensor module is shown in FIG. 5. It is especially well suited to obtain measuring values outside a central exchange (not shown here). For example, substrate 1 supports at least one sensor 20. It converts mechanical, thermal, electromagnetic, optical, particle radiation, or other measured values into electric signals 21 which are processed in a CMOS control circuit 22 according to conventional methods, e.g. in an integrated computer or in a logic array. The control circuit 22 directly controls a light modulator 24 of the type disclosed herein by means of off-state voltage U (FIG. 1) via circuit 23 (FIG. 5). Light is guided by means of a light fiber 25 to the light modulator 24. The light is modulated with information in the light modulator 24 and is guided away in an output fiber 26. An especially advantageous method involves obtaining all of the energy required for operation from a solar cell 27 which can for example be illuminated by a light carrying fiber 28. Information to be transmitted to the sensor module of FIG. 5 is guided by means of an information fiber 29 to an optical receiver 30 which is connected to the CMOS control circuit.

Appropriate and known means for the coupling and uncoupling of light make it possible to replace the light guiding fibers 25, 26, 28 and 29 by one single fiber. It carries light from the required frequency ranges to the sensor module and guides the information back to the central exchange.

Finally, the above-described embodiments of the invention are intended to be illustrative only. Numerous alternative embodiments may be devised by those skilled in the art without departing from the spirit and scope of the following claims.

I claim:

1. A light modulator comprising
   a semiconductor substrate,
   an epitaxial semiconductor layer formed at a surface of said substrate,
   a longitudinally extending waveguide for guiding light rays formed in said epitaxial layer, said waveguide comprising waveguide sections of first and second types which are formed alternately in series, said waveguide sections being delimited on the bottom by a layer formed at the interface between said substrate and said epitaxial layer, on top by a longitudinally extending insulated gate electrode, and on the sides by a pair of longitudinally extending strips,
   the ability of said sections of said first type to guide said light being variable by means of an applied voltage.

2. The light modulator of claim 1 wherein each of said waveguide sections of said first type is delimited in part by a depletion zone, the size of said depletion zone being controllable by a voltage to vary the ability of said waveguide sections of said first type to guide light.

3. The light modulator of claim 2 wherein the portions of said epitaxial layer incorporating said waveguide sections of said first type are of the same conductivity type as said substrate, said portions of said epitaxial layer incorporating said waveguide sections of said first type being separated from said substrate by at least one p-n junction, the portions of said epitaxial layer incorporating said waveguide sections of said second type having a conductivity type opposite to that of said substrate.

4. The light modulator of one of claims 1–3 characterized in that said waveguide has n+1 sections of said second type and n sections of said first type, where n is equal to at least one.

5. The light modulator of one of claims 1–3 wherein said waveguide sections of the first type have a length approximately equal to the length of said waveguide sections of the second type, said length being in the range of 40 $\mu$m–200 $\mu$m.

6. The light modulator of one of claims 1–3 wherein said substrate has a p-type conductivity, said layer formed at the interface between said substrate and said epitaxial layer has an n-type conductivity, the portions of said epitaxial layer incorporating said waveguide sections of said first type have a p-type conductivity, and the remainder of said epitaxial layer has an n-type conductivity.

7. The light modulator of one of claims 1–3 wherein said light modulator is formed integrally with other electronic components on said substrate.

8. The light modulator of claims 1–3 wherein said substrate is silicon.

9. The light modulator of claims 1–3 wherein said light rays have a wavelength in the range of 1.2 $\mu$m–2.0 $\mu$m.

10. A light modulator comprising
    a semiconductor body,
    a waveguide for guiding light rays formed in said body, said waveguide comprising waveguide sections of first and second types formed alternately in a series, said waveguide sections of said first type being delimited at least in part by a depletion zone, and
    means for applying a voltage for controlling the size of the depletion zone delimiting said sections of said first type to vary the ability of said sections of said first type to guide light, said voltage serving to vary the intensity of light propagating in said waveguide.

11. The modulator of claim 10 wherein said semiconductor body includes one or more electronic components formed integrally with said modulator.

* * * * *